US012752468B2

(12) United States Patent
Scheidt

(10) Patent No.: US 12,752,468 B2
(45) Date of Patent: Oct. 6, 2026

(54) PROCESSES FOR THE PRODUCTION OF AN EXTRUDED WEB MATERIAL FROM PLASTIC, EXTRUDED WEB MATERIAL AND TRANSPORT CONTAINERS

(71) Applicant: Gebr. Scheidt GmbH, Herford (DE)

(72) Inventor: Markus Scheidt, Hiddenhausen (DE)

(73) Assignee: GEBR. SCHEIDT GMBH, Herford (DE)

( * ) Notice: Subject to any disclaimer, the term of this patent is extended or adjusted under 35 U.S.C. 154(b) by 67 days.

(21) Appl. No.: 18/944,670

(22) Filed: Nov. 12, 2024

(65) Prior Publication Data

US 2026/0091540 A1 Apr. 2, 2026

(30) Foreign Application Priority Data

Oct. 1, 2024 (EP) .................................... 24203827

(51) Int. Cl.

*B29C 48/00* (2019.01)
*B29C 48/11* (2019.01)
*B29C 53/06* (2006.01)
*B29L 31/00* (2006.01)

(52) U.S. Cl.

CPC .......... *B29C 48/0019* (2019.02); *B29C 48/11* (2019.02); *B29C 53/06* (2013.01); *B29L 2031/712* (2013.01)

(58) Field of Classification Search

None

See application file for complete search history.

(56) References Cited

U.S. PATENT DOCUMENTS 5,944,252 A * 8/1999 Connelly .............. B32B 29/005 156/205
2017/0190135 A1* 7/2017 Takeuchi .............. B31B 50/252
2019/0168478 A1* 6/2019 Capoia ..................... B31B 50/20
2020/0108971 A1* 4/2020 McCarthy ............ B65D 5/5061

FOREIGN PATENT DOCUMENTS

WO WO-0247888 A1 * 6/2002 ........... B65D 5/4266
WO 2008/070512 A1 6/2008

* cited by examiner

*Primary Examiner* — Yung-Sheng M Tsui
*Assistant Examiner* — Melody Tsui
(74) *Attorney, Agent, or Firm* — Richard M. Goldberg

(57) ABSTRACT

A method for producing an extruded plastic sheeting material (12; 12'; 12") having a multitude of parallel hollow chambers (14) in its interior, includes the steps of extrusion of a sheet of the sheeting material (12; 12'; 12") that is continuous in the running direction (x) of the hollow chambers (14) while applying compressed air to the hollow chambers (14) from the inside, the production of weakening lines (16) in the sheet running transversely to the running direction (x) of the hollow chambers (14) by introducing creases (50) into the sheeting material (12), the depth of which is dimensioned in such a way that the hollow chambers (14) are not interrupted by the creases (50).

15 Claims, 5 Drawing Sheets

PROCESSES FOR THE PRODUCTION OF AN EXTRUDED WEB MATERIAL FROM PLASTIC, EXTRUDED WEB MATERIAL AND TRANSPORT CONTAINERS

BACKGROUND OF THE INVENTION

The present invention relates to a method for producing an extruded plastic sheeting material, which has a multitude of parallel hollow chambers in its interior. The invention, moreover, relates to a corresponding extruded sheeting material and a transport container made from such an extruded sheeting material.

For various applications, for example for packaging, plastic sheeting materials are known, for example, made of polypropylene, which have a structure similar to corrugated cardboard, which is to say, for example, consisting of two parallel outer layers, between which a corrugated layer is arranged, which divides the space between the outer layers into a multitude of hollow chambers. Such a sheeting material can be efficiently produced as a continuous material by extrusion. In a further embodiment, the sheeting material has a profile corresponding to a so-called webbed hollow chamber sheet, in which two parallel layers of sheets are connected by webs perpendicular to these layers of sheets, which webs separate the hollow chambers from one another transversely to their direction of extension. In this case, the hollow chambers have a rectangular or square profile.

The corrugated layer, or, more generally, the webs, which separate the individual hollow chambers, give the sheeting material a relatively high flexural rigidity in the running direction of the hollow chambers, which is to say, in the extrusion direction, which offers advantages when using the material or products made from it, but which can cause problems when handling and processing the sheeting material. These include the storage and transportation of the sheeting material. In principle, the sheeting material could be wound for the creation of a compact transport container, but there is a risk of damage to the material if it is bent too much while in the wound state. In addition, an undesirable residual curvature could remain when the material is unwound for further processing.

After the extrusion process, it was therefore considered to provide the sheeting material with weakening lines running transverse to the running direction of the endless sheet or the hollow chambers extending therein and then to fold the material in a zigzag shape along the weakening lines to form a package in which the individual layers of the sheeting material are stacked on top of each other.

For this purpose, document WO2008/070512 A1 discloses the possibility of deforming an extruded sheet of material provided with hollow chambers in the transverse direction by means of inscriptions in order to produce the weakening lines and to fold the sheet sections thus formed onto one another along the weakening lines.

This method cannot, however, be used in a production process in which the hollow chambers are pressurized from the inside with compressed air during extrusion to maintain their profile structure until the plastic material hardens. If a tool for forming the weakening lines then moves into the sheeting material, there is a risk that the pressurized hollow chambers will burst and the sheet structure will be destroyed at the weakening lines.

SUMMARY OF THE INVENTION

It is therefore one of the tasks of the present invention to further develop the known method for producing an extruded plastic sheeting material of the aforementioned type in such a way that the application of weakening lines in the sheeting material is made possible without destroying the integrity of the hollow chamber structure. A further task is the creation of a corresponding extruded plastic sheeting material and the creation of a transport container formed from it.

These tasks are solved by a method according to the claims, by an extruded sheeting material according to the claims and by a transport container according to the claims.

The method according to the invention also provides for the formation of weakening lines transverse to the running direction of the hollow chambers. These are created by introducing creases into the sheeting material. According to the invention, the depth of the creases is such that the hollow chambers are not interrupted by the creases.

When the creases are being produced, the sheeting material is not stamped through in such a way that individual sections of the hollow chambers are separated from one another in the running direction of the chambers. Rather, the hollow chamber sections communicate with one another before and after a crease, so that pressure equalization can take place along the entire length of the hollow chamber.

The air can thus escape in the direction of the hollow chambers when the tool for forming the creases enters the material sheet and deforms it. A bursting of the hollow chambers is hereby prevented. While it is true that the hollow chambers are compressed at the weakening lines, this compression does not represent an unacceptable impairment of the integrity of the hollow chamber profiles.

After the formation of the creases, the extruded sheeting material can easily be folded along the creases and, for example, folded together into a package-shaped transport container. Other uses are also conceivable, such as the folding of the sheeting material along the creases to form a box-shaped body or the like.

Preferably, the creases are created by mechanical action, by thermal action or by a combination of mechanical and thermal action.

More preferably, the creases are inscribed by a creasing body.

According to a further embodiment, the creases are created by a compressed air jet.

According to a further embodiment, the creases are created by a laser beam or a heat beam. Such a heat beam may, for example, be an infrared heat beam.

Preferably, the depth of the creases amounts to about two-thirds of the thickness of the sheeting material.

Preferably, the creases are created alternately on opposite sides of the sheeting material. Such an inscription is advantageous for the subsequent zigzag folding of the sheeting material into a package.

Further preferably, the weakening lines are produced while the extruded sheeting material continues to move in the running direction.

Further preferably, at least one tool for producing the weakening lines is moved synchronously with the sheeting material in the running direction.

According to a preferred embodiment, the tool for making the weakening lines is guided obliquely over the sheeting material, wherein a speed component of this oblique movement is equal to the speed of the sheeting material in the running direction. As a result, the tool is moved in the running direction synchronously with the sheeting material, while at the same time it is guided in a direction perpendicular to it across the sheet in order to introduce the crease.

It is conceivable, for example, to guide the tool along at least one rail that extends obliquely, for example, diagonally, across the material sheet.

According to a preferred embodiment of the present invention, the weakening lines are produced by means of at least one creasing blade, which extends across the entire width of the sheeting material.

The creasing blade can preferably be arranged on the circumference of a rotatable drum which, for producing the weakening line, is rotated into a position in which the creasing blade faces the material sheet. By rotating the drum synchronously with the movement of the material sheet in the running direction, the creasing blade can then approach the material sheet laterally, to enter the material sheet during the further rotation of the drum to form the crease without penetrating it, and then once again move away from the material sheet during the further rotation. It is, moreover, conceivable that the rotatable drum carrying the creasing blade can be raised and lowered by means of a lifting device. When a weakening line needs to be made, the drum is turned to an angled position in which the creasing blade faces the material sheet and the drum is lowered briefly to press the crease into the material sheet. The drum is then raised again so that the material sheet is released again. The advantage of this embodiment consists in that the drum does not need to rotate synchronously with respect to the movement of the material sheet.

A further embodiment of the method according to the invention additionally comprises the step of folding the sheet in a zigzag shape at the weakening lines to form a package of several superimposed panels.

The invention further relates to an extruded plastic sheeting material comprising a multitude of parallel hollow chambers in its interior, forming a sheet that is endless in the running direction of the hollow chambers and comprising weakening lines in the sheet, which lines run transversely to the running direction of the hollow chambers and which are formed by creases inscribed in the sheeting material, the depth of which is such that the hollow chambers are not interrupted by the creases.

The invention further relates to a transport container of an extruded sheeting material of the aforementioned type, which is formed by folding the sheet at the weakening lines in a zigzag pattern to form a package.

BRIEF DESCRIPTION OF THE DRAWINGS

In the following, preferred embodiments of the present invention are elucidated in more detail on the basis of the drawings.

DETAILED DESCRIPTION

Figure 1:
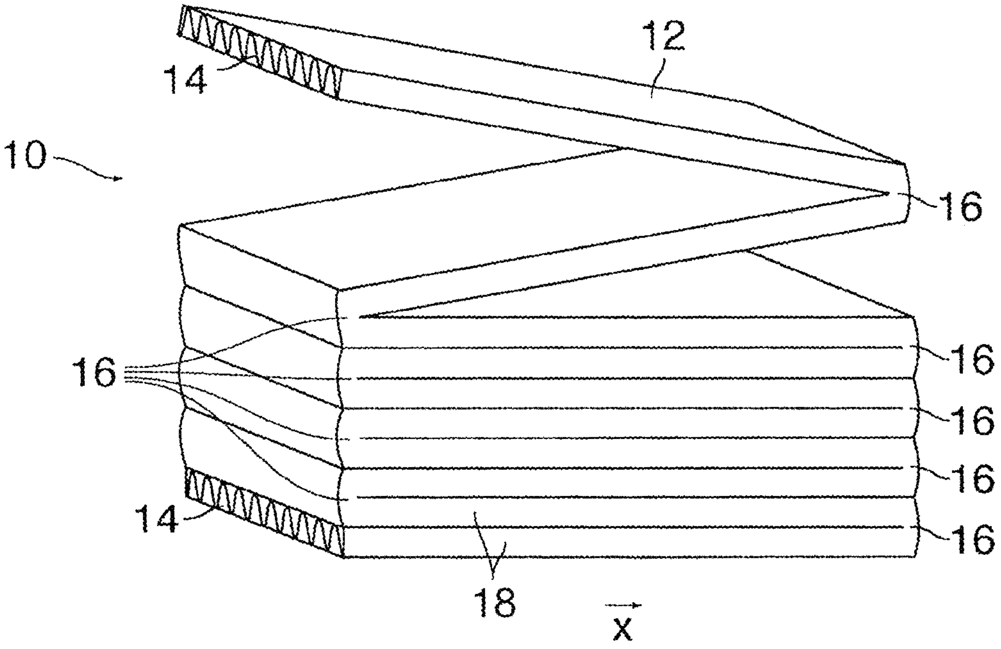
FIG. 1 shows a perspective view of a transport container according to the invention.

FIG. 1 shows a transport container 10 that consists of several layers of an endless sheeting material 12 made of plastic, for example polypropylene. The representation in FIG. 1 and also in the other figures is not to scale, in particular with regard to the ratios of the width, thickness, and length of the individual layers to one another.

The sheeting material 12 was produced by extrusion and comprises, on the inside, a multitude of parallel hollow chambers 14, the open ends of which can be seen in FIG. 1 at the edge of the bottommost and topmost layers. The running direction x of the hollow chambers 14 is indicated by an arrow in FIG. 1 and corresponds to the extrusion direction during the production of the endless strand.

The endless strand of sheeting material 12 has been weakened at regular intervals by weakening lines 16, which divide the strand into individual panels 18. The weakening lines 16 have been made by introducing creases into the sheeting material 12 at the relevant point of the strand, for example, by stamping or inscribing. The sheeting material 12 is, however, not fully stamped through in the sense that the hollow chambers 14 are interrupted in the running direction x and separated into individual sections the interiors of which no longer communicate with one another. Rather, the depth of the creases is such that the hollow chambers 14 are not interrupted by the creases. In this respect, the representation of the weakening lines 16 in FIG. 1 is also to be understood as only being schematic. Their structure is to be elucidated more precisely on the basis of FIG. 8 and FIG. 9.

As a result of the application of the weakening lines 16, the material locally loses its flexural rigidity. In this way, the endless sheet of the sheeting material 12 (also referred to in the following as material sheet) can be folded in a zigzag manner along the weakening lines 16 and gathered into a package, as shown in FIG. 1. In this package, the panels 18, each bounded by two consecutive weakening lines 16, lie flush on top of each other. For the purpose of clarity, the two uppermost layers in FIG. 1 are shown in a state that is not yet fully folded together.

Possible methods for producing the transport container according to FIG. 1 are elucidated below with reference to FIG. 2 through FIG. 4.

Figure 2:
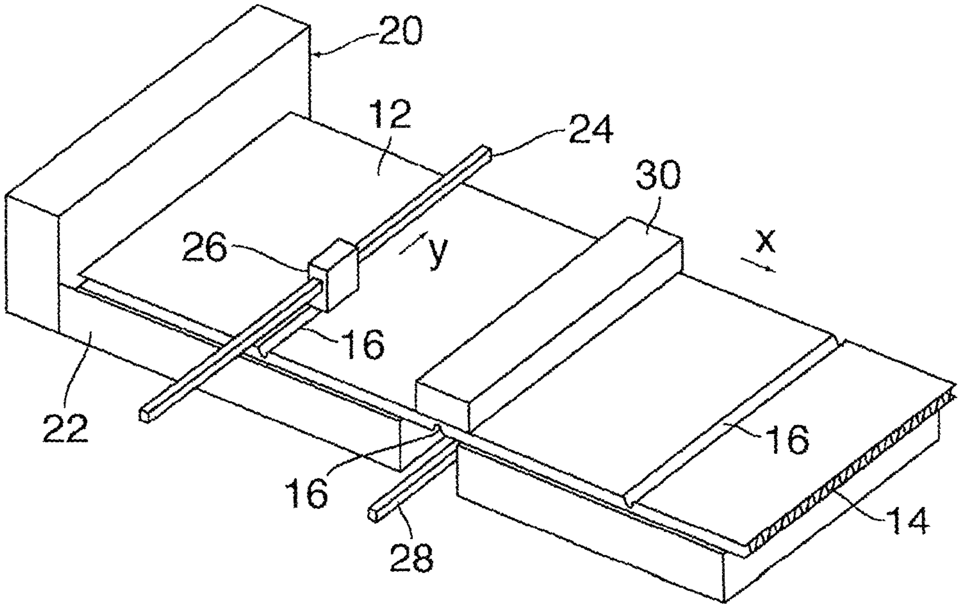
FIG. 2 and FIG. 2A show schematic views of devices for producing the transport container according to FIG. 1.

An extrusion line 20 is schematically shown in FIG. 2, with which a sheet of sheeting material 12 is extruded as an endless strand. During this extrusion, the hollow chambers 14 inside the sheeting material 12 are pressurized with compressed air so that they retain their profile structure until the plastic has cured.

The freshly extruded strand is supported on a bed 22, over which a rail 24 extends transversely to the running direction x of the hollow chambers 14, on which rail a creasing tool 26 can be moved. The creasing tool 26 comprises a roller, not shown in more detail, which presses a crease forming the weakening line 16 into the upper side of the sheeting material 12. In FIG. 2, the creasing tool 26 moves in the direction of an arrow y over the material sheet, so that only a part of the weakening line 16 is completed.

A further guide rail 28 with a (not visible) creasing tool corresponding to the creasing tool 26 is arranged further downstream on the underside of the material sheet in a gap in the bed 22, and above the guide rail 28, the upper side of the material sheet is supported by an abutment 30, so that a further weakening line 16 can be creased into the underside of the material sheet by means of this creasing tool. Further to the right in FIG. 2, a further weakening line 16 can be recognized, which weakening line was produced at an earlier point in time in the upper side of the sheet by means of the creasing tool 26.

The weakening lines are preferably produced closely after the extrusion line 20 at a point in time when the plastic material of the material sheet 12 has not yet completely solidified, so that the webs between the individual hollow chambers 14 can be easily deformed. While the creases in the embodiment shown here are created by a creasing tool 26, that is, by mechanical action, it is possible to create the creases by thermal action or by a combination of mechanical and thermal action. It is conceivable to create the creases by means of a compressed air jet, a laser beam or an infrared heat beam. The above-mentioned possibilities can be combined as desired.

If the extrusion speed is sufficiently low, the creasing tools 26 can be moved over the material sheet so quickly that the extrusion process does not need to be interrupted. In another process variant, the sheeting material 12 is extruded intermittently, so that the material sheet is briefly stopped after each extrusion step, while the creasing tools move (preferably simultaneously) over the material sheet. In a further embodiment, it is also possible to mount the guide rails 24 in such a way that they can be moved and driven in such a way that they can move synchronously with the material sheet 12. In this case, the width of the abutment 30 and the width of the corresponding gap in the bed 22 should be greater than the distance that the creasing tool 26 covers in the running direction x.

Figure 2A:
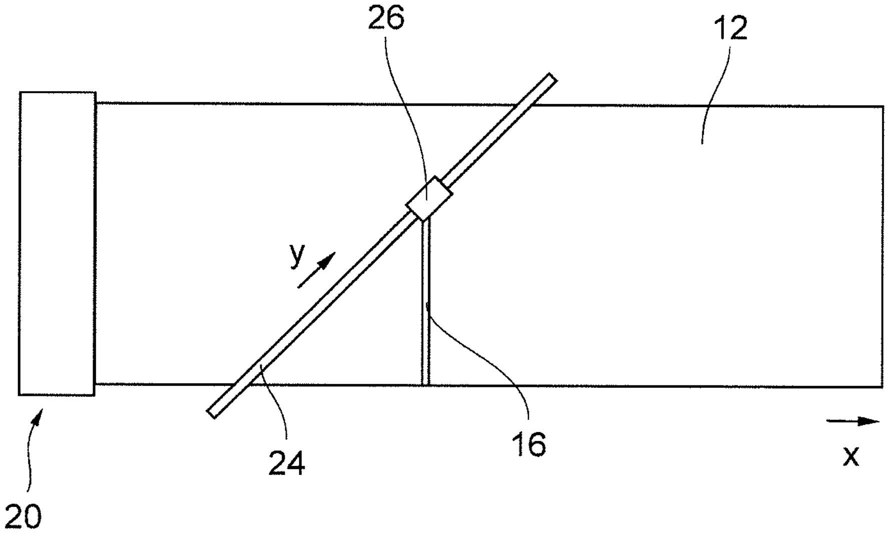

FIG. 2A shows an embodiment in which, similar to FIG. 2, a creasing tool 26 is guided along a guide rail 24 over the top side of the sheeting material 12 in a plan view. Here, too, the creasing tool 26 has a roller, not shown in detail, which presses a crease forming the weakening line 16 into the top side of the sheeting material 12. In FIG. 2A, the creasing tool 26 moves in the direction of an arrow y, obliquely across the material sheet, which is to say, its direction of movement y encloses an angle with the running direction x of the sheeting material 12 and with the cross direction (perpendicular to the running direction x). In the present case, the angle between the direction of movement y of the creasing tool 26 (corresponding to the direction in which the guide rail 24 extends) and the running direction amounts to 45°, which is to say, the guide rail 24 extends diagonally across the material sheet. Another angle can also be selected within the scope of the invention.

The movement of the creasing tool 26 along the guide rail 24 in the direction of movement y has a speed component in the running direction x of the sheeting material 12 and in the direction perpendicular thereto across the material sheet. In this case, the speed component in the running direction x is equal to the speed of the sheeting material, which is to say, these speeds of the sheeting material 12 and the creasing tool 26 are synchronized in the running direction x. During its movement along the guide rail 24, the creasing tool 26 moves in the running direction x synchronously with the sheeting material 12 and at the same time completely oblique to it. The creasing tool 26 itself can be configured according to the embodiment in FIG. 2. Alternative possibilities can be provided for guiding the creasing tool 26, such as a plurality of parallel guide rails 24 or other types of guides that allow synchronous control of the creasing tool 26 and the sheeting material 12 in the manner described. In another embodiment, the weakening lines 16 are produced by means of the creasing blade which extends across the entire width of the material sheet 12, so that the complete weakening line can be produced in a very short processing step, even with very wide material sheets.

Figure 3:
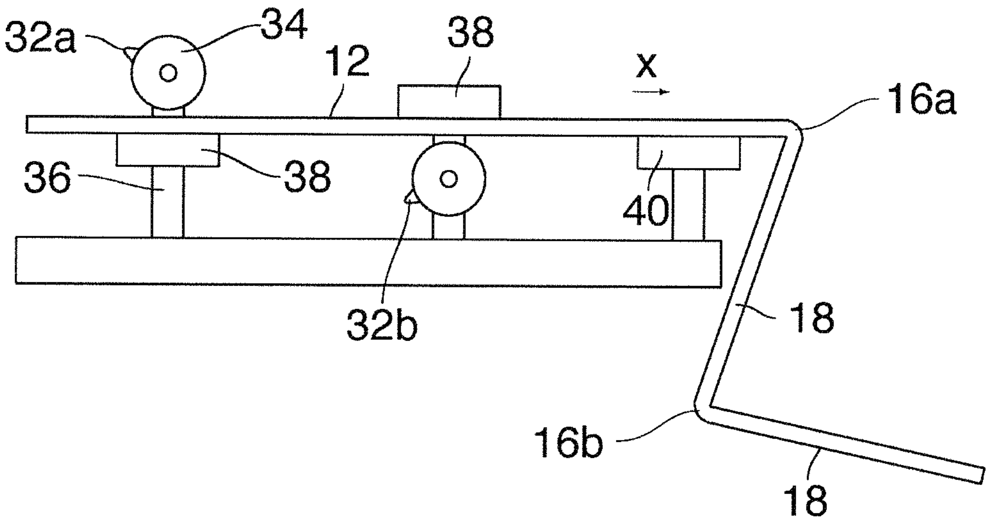
FIG. 3 and FIG. 4 show schematic diagrams of alternative devices for producing the transport container.

FIG. 3 shows an embodiment in which a creasing blade 32*a* is formed on the circumference of a drum 34 that is arranged rotatably and closely above the strand of the sheeting material 12 (which is to say the material sheet.) In the example shown, the drum 34 can also be raised and lowered by means of a lifting device 36. When a weakening line 16 is to be made, the drum 34 is turned to an angled position in which the creasing blade 32*a* faces the material sheet, and the drum 34 is briefly lowered to imprint the crease in the sheeting material 12. The drum is then raised again so that the material sheet is once again released.

The entire process can be carried out in such a short time that the extrusion of the material sheet 12 need not be interrupted, especially if the circumferential speed of the drum 34 can be synchronized with the sheet speed. Alternatively, it is, however, also possible to move the drum 34 and an opposing abutment 38 synchronously with the material sheet 12. In yet another embodiment, the circumference of the drum 34 may be so large that it corresponds to the length between two consecutive weakening lines on the same side of the material sheet. The drum 34 can be rolled directly on the material sheet, and the weakening line is produced when the creasing blade 32*a* passes through the position where the drum 34 is in contact with the material sheet.

FIG. 3 moreover shows a second arrangement of a creasing blade 32*b* and an abutment 38, which are arranged in an inverted position to the material sheet in order to stamp a crease into the underside of the material sheet.

Even further downstream, the material sheet 12 is supported on a table 40.

In the state shown in FIG. 3, a weakening line 16*a*, which has been formed in the upper side of the material sheet by means of the first creasing blade 32*a*, has just passed the end of the table 40, so that the part of the material sheet located beyond this weakening line 16*a* tilts downwards, as can be seen in FIG. 3. At an earlier point in time, a weakening line 16*b* has been formed in the underside of the material sheet by means of the second (lower) creasing blade 32*b*. The material sheet can be angled in the opposite direction at this weakening line. In this way, the endless sheet can be folded like a concertina (or in a zigzag shape) at the exit of the table 40 and folded up into the transport container 10 shown in FIG. 1.

Figure 4:
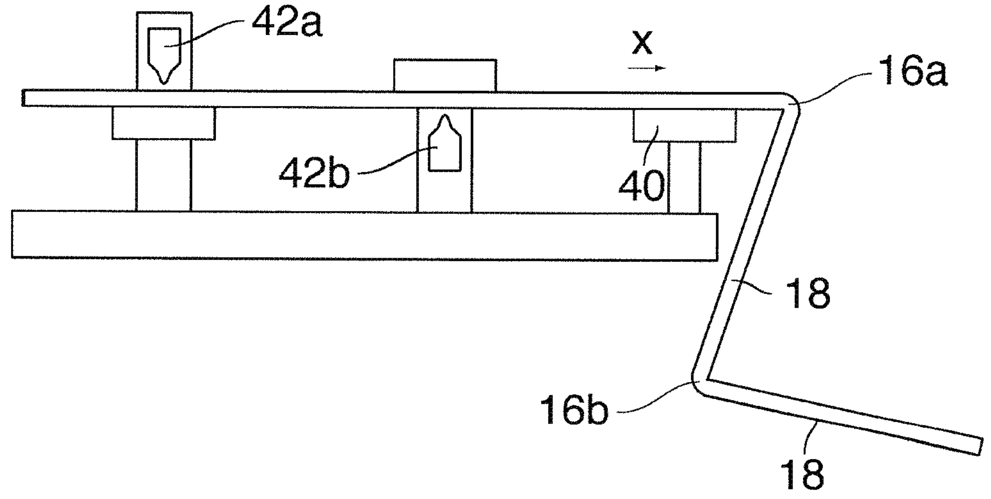

FIG. 4 shows a modified embodiment in which, lifting creasing blades 42*a*, 42*b* are provided instead of the rotatable drum 34.

Figure 5:
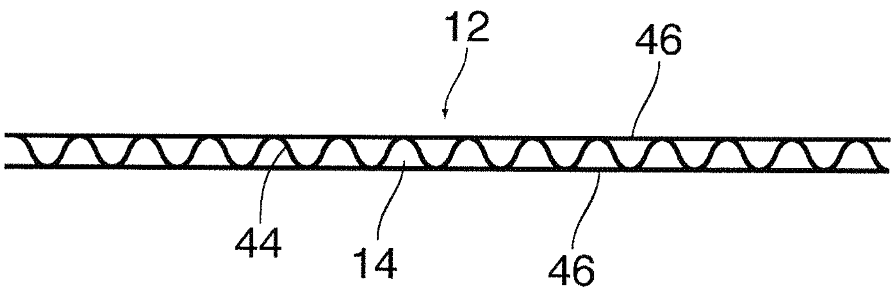
FIG. 5 through FIG. 7 show examples of profile shapes of sheeting materials from which the transport container according to the invention can consist.

FIG. 5 shows an enlarged cross-section of the sheet of sheeting material 12 so that the structure of the hollow chambers 14 can be recognized more clearly. In the profile of the sheeting material 12 shown here, a single corrugated layer 44, which forms the hollow chambers 14, is arranged between two smooth outer sheet layers 46.

Figure 6:
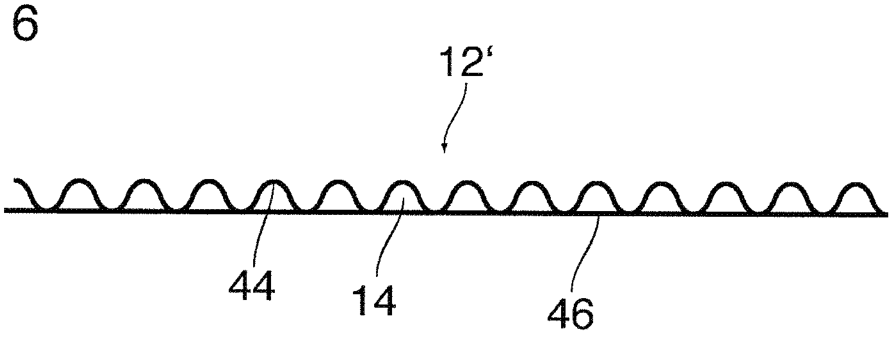

FIG. 6 shows a sheet of sheeting material 12' with a different possible profile, in which one of the smooth sheet layers 46 is left out.

Figure 7:
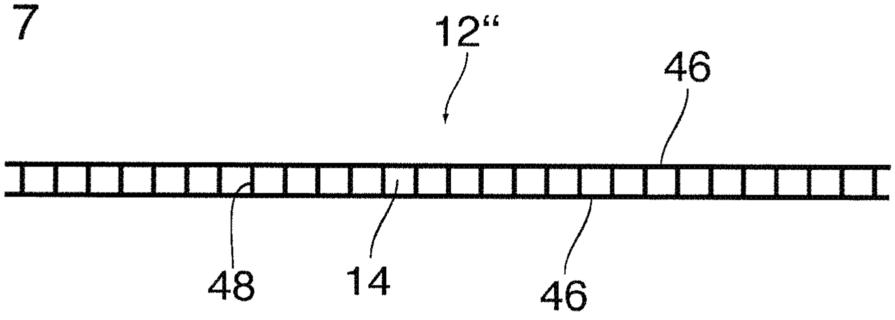

FIG. 7 shows a further example of a sheet of the sheeting material 12", with a profile corresponding to a so-called webbed hollow chamber sheet, with two parallel sheet layers 46, which are connected by webs 48 perpendicular to these sheet layers, which webs separate the hollow chambers 14 from each other. In this example, the hollow chambers 14 thus have a rectangular or square profile.

Figure 8:
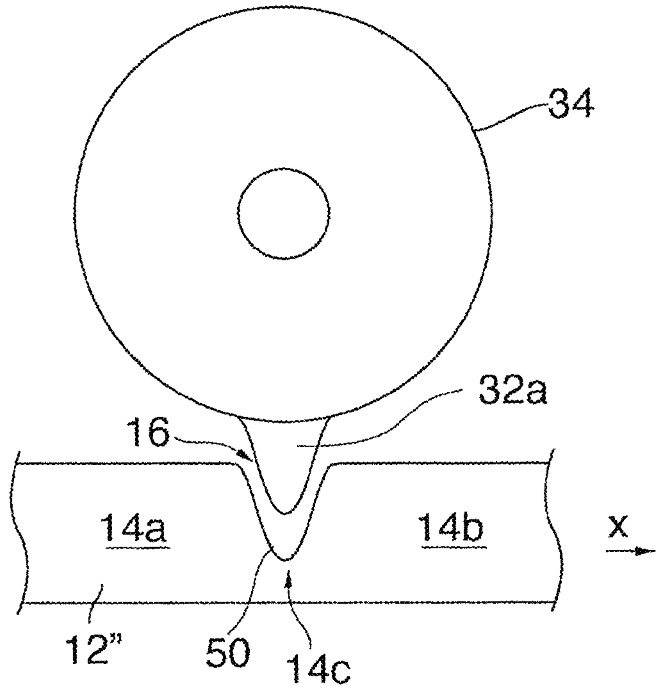
FIG. 8 schematically shows a cross-section through a material sheet with a profile shape corresponding to FIG. 7 along the running direction in the area of a weakening line.

FIG. 8 shows a cross-section through the sheet of the sheeting material 12" from FIG. 7 from a different cross-sectional direction, wherein the cross-section follows the running direction x along a hollow chamber 14. This figure thus shows a section along a single hollow chamber 14 of the sheeting material 12" in an area in which a weakening line 16 is produced in the sheet. This is done by inscribing a crease 50 into the sheeting material 12" by means of a creasing blade 32*a*, which is attached to the circumference of a drum 34, according to the embodiment of FIG. 3.

The hollow chambers 14 of the sheeting material 12" are hereby impressed and compressed. The cross-section of the hollow chambers shown in FIG. 7 is deformed in the process, but the hollow chamber 14 is not interrupted. Rather, a section 14*a* of the hollow chamber 14 located upstream of the creasing tool 32*a* (with respect to the running direction x) and a section 14*b* of the same hollow chamber 14 located downstream of the creasing tool 32*a* are connected to one another at a compressed region 14*c* at the location of the weakening line 16 in such a way that the two sections 14*a* and 14*b* communicate with one another. The depth of the inscription of the crease 50 corresponds to about two-thirds of the thickness of the sheeting material 12".

If the hollow chamber 14 is under pressure, as is the case with the extrusion process in the context of the present invention, during the inscription of the crease 50, the pressure can escape along the entire hollow chamber profile that is not interrupted by creases.

This avoids the hollow chamber 14 bursting open and the associated destruction of the integrity of the profile of the sheeting material 12".

Figure 9:
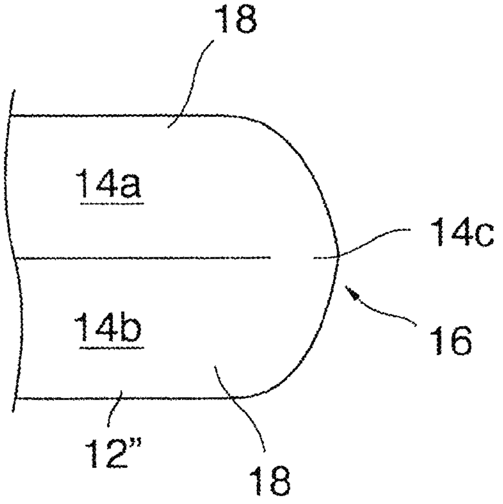
FIG. 9 schematically shows a cross-section through the material sheet from FIG. 8 in the folded state.

FIG. 9 shows a cross-section through the sheet of the sheeting material 12" from FIG. 8 in a state in which the successive sections 14*a* and 14*b* of the hollow chamber 14 in the running direction x, are folded after forming of the crease 50 along the weakening line 16 formed hereby, as is approximately the case in the transport container 10 in FIG. 1. These sections 14*a* and 14*b* are then associated with panels 18 lying on top of each other.

What is claimed is:

1. A method for producing an extruded plastic sheeting material comprising a multitude of parallel hollow chambers in its interior, comprising the steps of:
- extrusion of a sheet of the sheeting material that is continuous in a running direction of the hollow chambers while applying compressed air to the hollow chambers from the inside thereof, and
- production of weakening lines in the sheet running transversely to the running direction of the hollow chambers by the step of introducing creases into the sheeting material, such that the creases have a depth that the hollow chambers are not interrupted by the creases, and a section of the hollow chamber located upstream of the crease with respect to the running direction and a section of the same hollow chamber located downstream of the crease are connected to one another at a compressed region at the location of the weakening line in such a way that the two sections communicate with one another.

2. A method according to claim 1, wherein the step of introducing includes the step of creating the creases by one of:
- mechanical action,
- thermal action or
- a combination of mechanical and thermal action.

3. A method according to claim 2, wherein the step of introducing includes the step of inscribing the creases by a creasing body.

4. A method according to claim 2, wherein the step of introducing includes the step of creating the creases by a compressed air jet.

5. A method according to claim 2, wherein the step of introducing includes the step of creating the creases by one of:
- a laser beam or
- a heat beam.

6. A method according to claim 1, wherein the depth of the creases amounts to about two-thirds of the thickness of the sheeting material.

7. A method according to claim 1, wherein the step of introducing includes the step of creating the creases are alternately on opposite sides of the extruded sheeting material.

8. A method according to claim 1, wherein the step of production includes the step of making the weakening lines while the extruded sheeting material is continuously moving in the running direction.

9. A method according to claim 8, wherein the step of production includes the step of moving at least one tool for producing the weakening lines synchronously with the sheeting material in the running direction.

10. A method according to claim 9, wherein the step of production includes the step of guiding the at least one tool for producing the weakening lines obliquely over the sheeting material, such that a speed component of this oblique movement in the running direction is equal to the speed of the sheeting material.

11. A method according to claim 1, wherein the step of production includes the step of producing the weakening lines by at least one creasing blade extending across the entire width of the sheeting material.

12. A method according to claim 11, wherein the creasing blade is arranged on the periphery of a rotatable drum, and wherein the step of producing the weakening line includes the step of rotating the rotatable drum into a position in which the creasing blade faces the sheet of the sheeting material.

13. A method for producing a transport container of an extruded plastic sheeting material, comprising the steps of:
- performing the steps of the method according to claim 1 and
- folding the sheet into a package of a plurality of superposed panels in a zigzag manner at the weakening lines.

14. An extruded plastic sheeting material comprising a multitude of parallel hollow chambers in its interior, forming a sheet that is endless in a running direction of the hollow chambers and including weakening lines in the sheet, which weakening lines run transversely to the running direction of the hollow chambers and which are formed by creases inscribed in the sheeting material, the depth of which is such that the hollow chambers are not interrupted by the creases, and a section of the hollow chamber located upstream of the crease with respect to the running direction and a section of the same hollow chamber located downstream of the crease are connected to one another at a compressed region at the location of the weakening line in such a way that the two sections communicate with one another.

15. A transport container of an extruded plastic sheeting material according to claim 14, which is formed by the sheet being folded in a zigzag at the weakening lines to form a package.

* * * * *